United States Patent [19]
Gifford

[11] 3,883,746
[45] May 13, 1975

[54] DAYLIGHT-LOADING FILM-HOLDER FOR EXPOSING VERTICALLY DISPOSED X-RAY FILM

[75] Inventor: Charles J. Gifford, Lake Elmo, Minn.

[73] Assignee: Minnesota Mining and Manufacturing Company, St. Paul, Minn.

[22] Filed: Nov. 23, 1973

[21] Appl. No.: 418,418

[52] U.S. Cl. ................. 250/475; 250/480; 250/481
[51] Int. Cl. ........................................... G03b 41/16
[58] Field of Search..................... 250/480, 481, 475

[56] References Cited
UNITED STATES PATENTS

| | | | |
|---|---|---|---|
| 2,056,279 | 10/1936 | Kulick | 250/480 |
| 2,371,843 | 3/1945 | Powers | 250/480 |
| 3,174,039 | 3/1965 | Trede | 250/480 |

Primary Examiner—James W. Lawrence
Assistant Examiner—C. E. Church
Attorney, Agent, or Firm—Alexander, Sell, Steldt & DeLaHunt

[57] ABSTRACT

A film-holder that may be rapidly and conveniently loaded in open daylight, and that is adapted to be supported in vertical position so as to be useful for taking chest X-rays. The film-holder comprises a shallow receptacle; a front plate pivotably attached to the receptacle that moves between a position closing the receptacle and a rest position in which film may be laid on the inside surface of the front plate; positioning means for holding the film in the desired position on the inside surface of the front plate; engagement means for holding the front plate in the closed position fully engaged against the receptacle; and exhaust means for evacuating the film-holder when the front plate is in its closed position.

6 Claims, 6 Drawing Figures

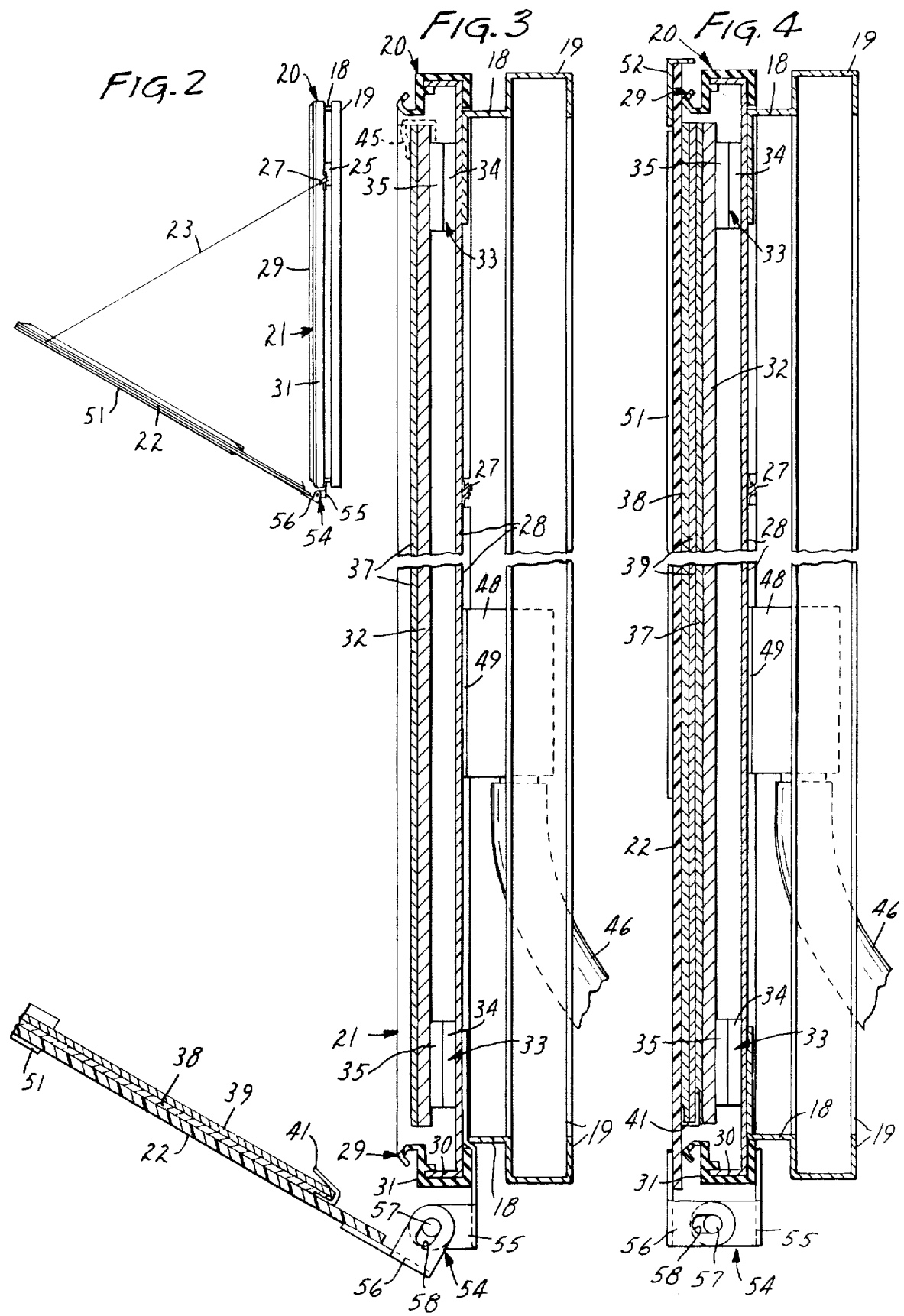

DAYLIGHT-LOADING FILM-HOLDER FOR EXPOSING VERTICALLY DISPOSED X-RAY FILM

The present invention provides a film-holder that uses a recently developed X-ray film to make possible improved radiographic or X-raying procedures. This new X-ray film has a low sensitivity to a portion of the visible spectrum of light, and the result is that the film is not "fogged" or prematurely exposed if handled openly in an X-ray room that is lighted only with the described portion of the visible light spectrum.

The film-holder of the present invention is specifically intended for exposing film in the vertical position, as for the taking of chest X-rays; and a film-holder of the invention can be rapidly and conveniently loaded simply by directly inserting X-ray film into the film-holder while the film-holder is mounted in the vertical position. The new film-holder comes within the general class of film-holder described in a pending application of Shaffer, Ser. No. 363,966, which is incorporated herein by reference. However, the specific film-holders described in Shaffer, Ser. No. 363,966, were intended for use in a "bucky" tray of an X-ray table and were generally loaded while in a horizontal position. The new film-holder of the present invention includes structure that makes it possible for the film-holder to be mounted in a vertical position and at the same time to be easily loaded and operated to take sharp, well-exposed chest X-rays.

A film-holder of the invention generally comprises (1) a shallow receptacle that comprises a rigid large-area back plate and edgewalls attached around the periphery of the back plate, the edgewalls extending perpendicularly from one side of the back plate to define an open front of the receptacle, and the edgewalls comprising at least at their outer extremity a resilient gasket member that extends continuously around the open front of the receptacle and whose outer edge defines a single plane; (2) a rigid large-area front plate pivotably attached to the receptacle in position to rest against the outer edge of the gasket member to close the receptacle and adapted to be drawn toward the back plate a uniform amount over the whole area enclosed by the gasket member; (3) a pressure plate supported in front of and parallel to the back plate; (4) a first intensifying screen attached over the pressure plate and a second intensifying screen attached over the inside surface of the front plate; (5) limiting means for limiting pivotal movement of the front plate from its closed position to an opened position in which an X-ray film can be laid onto the inside surface of the front plate on top of said second intensifying screen, and for holding the front plate in said opened position; (6) positioning means on said front plate for holding said X-ray film in a defined position on the inside surface of the front plate; (7) engagement means for holding the front plate in the closed position fully engaged against the gasket member; and (8) an exhaust port located in the receptacle or front plate for attachment to a vacuum source, whereby a vacuum may be formed within the film-holder to draw the front plate toward the bottom plate and tightly sandwich film between the two intensifying screens.

DESCRIPTION OF THE DRAWINGS

FIG. 2 is a side elevation view of a film-holder of the invention, opened to receive X-ray film;

FIGS. 3 and 4 are sectional views of a film-holder of the invention;

DETAILED DESCRIPTION

Figure 1:
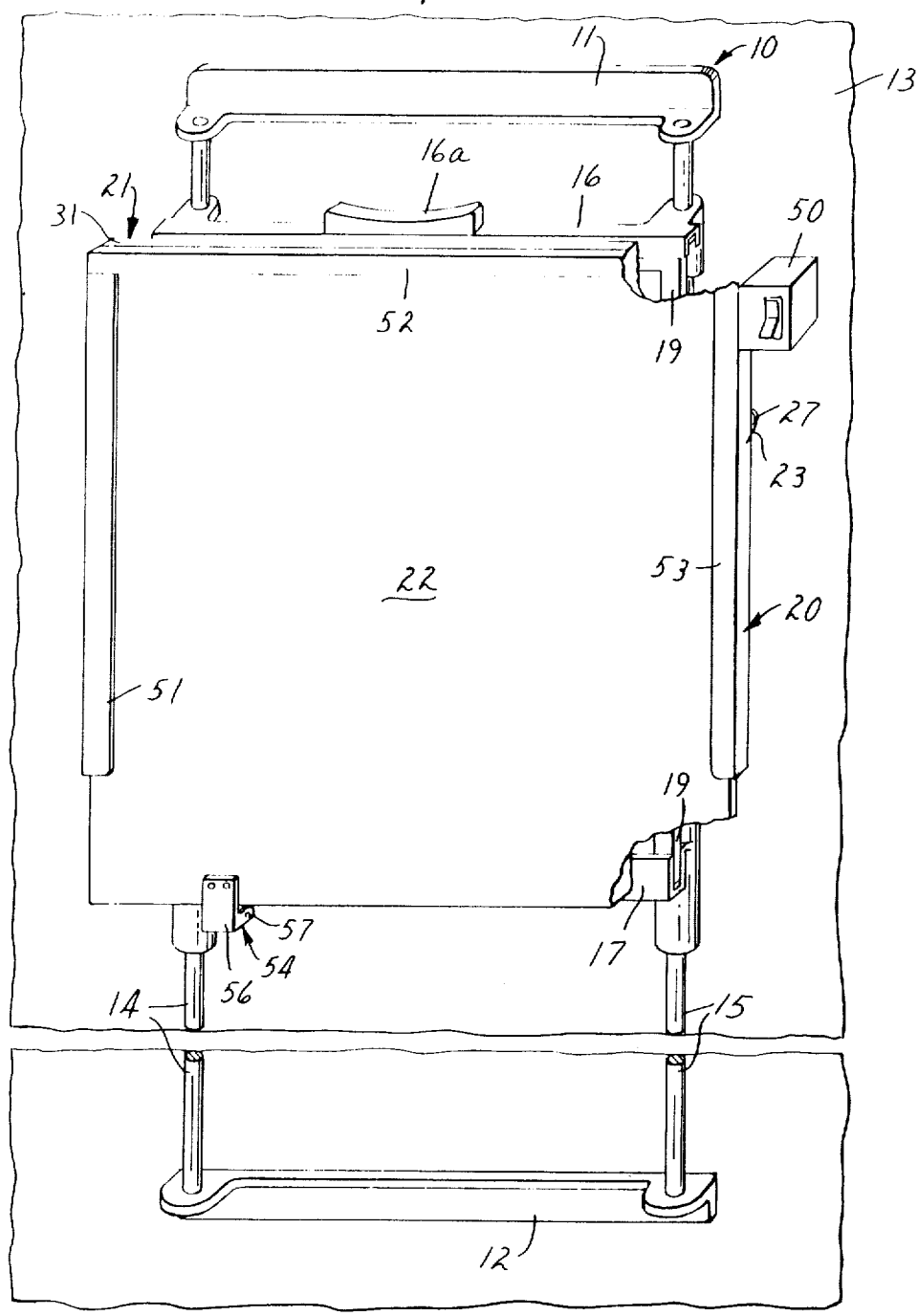
FIG. 1 is a perspective view of a film-holder of the invention held in a conventional wall-mounted support for X-ray cassettes.

FIG. 1 shows a wall-mounted support 10 that is conventionally used to hold an X-ray cassette while a person being X-rayed stands with his chest against the X-ray cassette. Film-holders of the invention are in one form adapted to be supported in the same supports used to hold X-ray cassettes. The support 10 shown in FIG. 1 comprises a pair of brackets 11 and 12 attached to a wall 13; poles 14 and 15 supported vertically by the brackets 11 and 12; and clamps 16 and 17 that slide vertically on the poles 14 and 15 and that normally hold an X-ray cassette. Clamp 16 carries a chin rest 16a.

In the embodiment of the invention shown in FIG. 1, the clamps 16 and 17 of the support 10 hold a rectangular adapter frame 19 that is attached to the back of a film-holder 20 of the invention by flanges 18 (see FIGS. 3 and 4). In some embodiments of the invention, a film-holder of the invention does not carry an adapter frame, but is attached to a wall-mounted support or to other supports by different means. However, use of an adapter frame has the advantage that film-holders of the invention may be conveniently mounted in supports such as the support 10 and may be readily replaced when it is desired to use special-purpose cassettes or film-holders instead of the film-holder then mounted in the support.

As shown best in FIGS. 2 and 3, a film-holder 20 of the invention includes a shallow open-fronted receptacle 21 and a front plate 22 pivotably attached to the receptacle 21. The front plate 22 can be opened to an opened or rest position, as shown in FIG. 2, where the front plate is held by limiting means. In the illustrated embodiment, the limiting means take the form of cords 23 and 24 that are attached to the sides of the front plate 22 and are normally held under spring tension in wound rolls inside cans 25 and 26 mounted on the back of the film-holder (see FIG. 5). The cords pass over pulleys 27 attached to the sides of the receptacle. When the front plate is opened, the cords 23 and 24 unwind from the cans 25 and 26 until they reach the fully extended position shown in FIG. 2, whereupon the cords hold the front plate in the position shown in FIG. 2. Desirably the weight of the front plate 22 balances the spring tension on the cords 23 and 24 so that the front plate remains in the opened position shown in FIG. 2 until moved by an operator to the closed position. In other embodiments of the invention the limiting means takes the form of articulated brace members, the ends of which are attached to the front plate 22 and receptacle 21.

As shown best in FIGS. 3 and 4, the shallow open-fronted receptacle 21 includes a back plate 28, and edgewalls 29 that comprise a base edgewall 30 and a resilient gasket member 31, generally molded from rubber, mounted over the base edgewall. A pressure plate 32, which generally is a rigid metal or an extruded or molded synthetic polymeric plate, is supported in spaced relation to the back plate by spacing means 33. In the illustrated embodiment, the spacing means 33 is a fastener of the type described in U.S. Pat. No. 3,266,113. This fastener comprises two complementary members, one, 34, being attached to the back plate 28, and the other, 35, being attached to the pressure plate. The two members 34 and 35 carry a plurality of flexible stemmed elements (not shown) with enlarged heads that releasably interengage the elements on the other member. By the use of such releasable fasteners, the pressure plate 32 may be removed from the receptacle 21 if that is desired. Alternatively, the spacing means 33 may comprise flat foam rubber sheets or other resilient means, which permit the pressure plate to move resiliently toward the back plate when a vacuum is drawn within the film-holder to draw the front plate toward the back plate. A radiation-intensifying screen 37 is adhered to the outside of the pressure plate.

Figure 6:
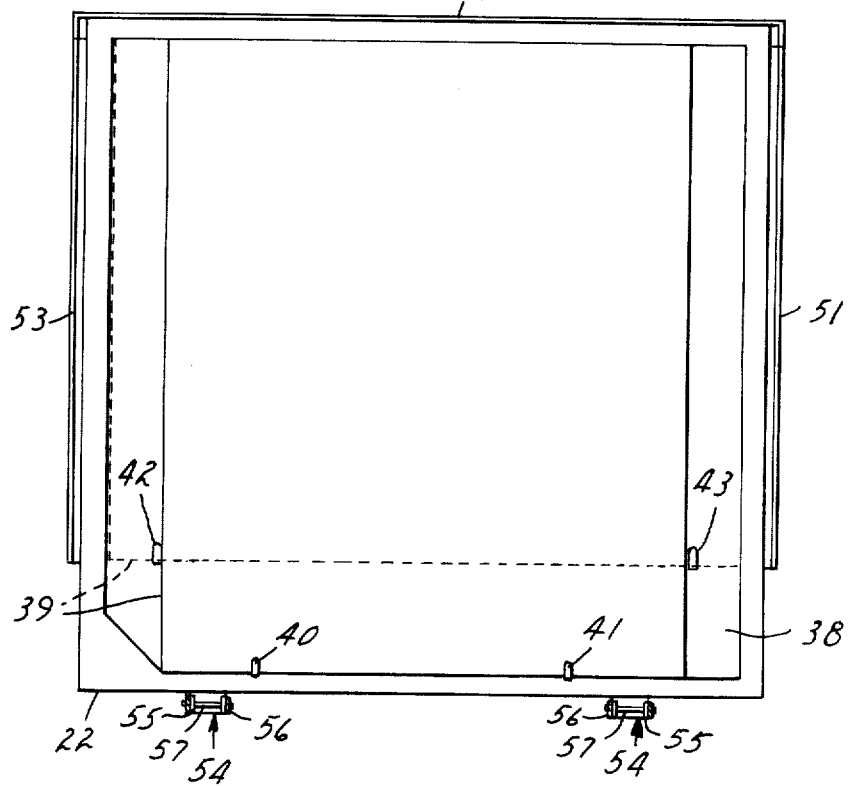
FIG. 6 is a plan view of the inside surface of the front plate of a film-holder of the invention.

The front plate 22 also carries a radiation-intensifying screen 38, and film is sandwiched between the two intensifying screens 37 and 38 during exposure. A sheet 39 of X-ray film is usually inserted into the illustrated film-holder of the invention by laying the film on the inside surface of the front plate while the front plate is in its opened position as shown in FIGS. 2 and 3. Positioning means hold the sheet of film 39 in a desired exposure position on the intensifying screen, and in the illustrated embodiment, the positioning means comprises short angled tabs 40, 41, 42, and 43. The tabs are flexible so that they can be flexed flat when a vacuum is drawn within the film-holder and the front plate is pressed tightly toward the back plate 28 to tightly sandwich the film between the intensifying screens 37 and 38. As shown in FIG. 6, there are four tabs in the illustrated embodiment, two of the tabs 40 and 41, holding a sheet 39 of film in one position shown in full lines (for more vertically elongated X-rays), and the other two tabs, 42 and 43, holding the film in a second position shown in dotted lines.

In some embodiments of the invention, the positioning means for holding film in exposure position includes clips, such as the clip 45 shown in dashed lines in FIG. 3, that press against the face of the intensifying screen 37 on the pressure plate 32. Such clips are used so that unusually sized sheets of film, for example, may be inserted directly in place against the intensifying screen 37 on the pressure plate and held there.

Figure 5:
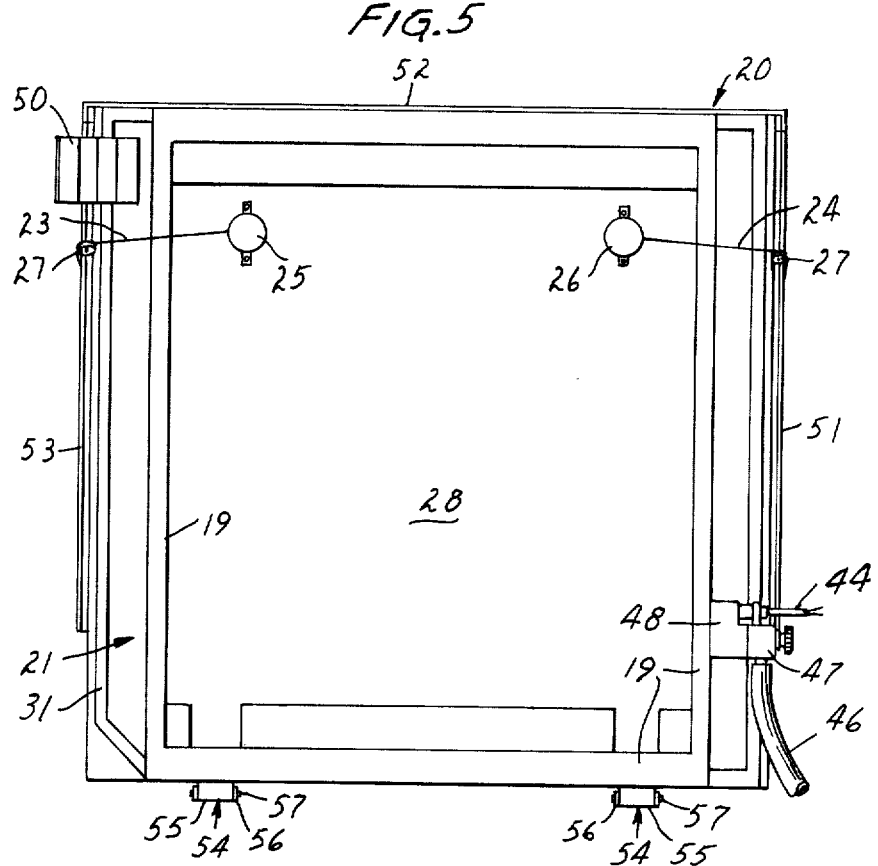
FIG. 5 is an elevation view of the back of a film-holder of the invention.

In the illustrated embodiment, the film-holder is evacuated by air pump means that is connected to the film-holder through an air hose 46 attached to a fitting 47 that makes tight sliding connection to a fitting 48 attached to the receptacle 21 (see FIG. 5 as well as FIGS. 3 and 4). The fitting 48 is attached over an opening (not shown) in the back plate 28 of the receptacle, and a gasket 49 is provided around the opening between the fitting 48 and back plate 28. Electrical conductors 44 are connected to the fitting 47, which makes electrical connection through the fitting 48 with electrical conductors inside the film-holder to provide electrical connection between a switch 50 attached to the side of the receptacle 21 and the air pump motor.

The front plate 22 is preferably made from a rigid material, such as a metal or a molded or extruded synthetic polymeric material. In the illustrated embodiment the front plate is made more rigid by the use of reinforcing plates 51, 52, and 53 attached to the front plate. The rigidity of the front plate assures that the plate will provide good support for film when the front plate is opened to its rest position, and assures that the front plate will remain flat and thus be adapted to make full contact with the gasket member around the whole open front of the receptacle 21.

The spring-tensioned cords 23 and 24 act as engaging means, holding the front plate 22 tightly in engagement against the gasket member 31, so as to assure that when the exhaust apparatus is activated, a vacuum will form inside the film-holder and draw the front plate 22 toward the back plate 28 of the receptacle 21. The front plate may be held in the closed position by other engaging means, such as latches; for example, in some embodiments of the inventions short cylindrical knobs or catches are attached to each of the two sides of the front plate, and when the front plate is moved into its closed position, the catches resiliently slide over cylindrical knobs attached to the receptacle. In other embodiments of the invention, the holding means take the form of fasteners disposed around the edgewalls of the receptacle and the mating portions of the front plate. For example, strips of polymer-based magnet may be mounted around the periphery of the edgewalls of the receptacle, and cooperating magnets or metal strips attached to the front plate; or strips or hook-and-loop fasteners as taught in U.S. Pat. No. 3,009,235 may be used.

The front plate 22 is attached to the receptacle by hinges 54 that comprise a hinge number 55 attached to the receptacle 21, a hinge member 56 attached to the front plate 22, and a pin 57 that extends through the hinge members 55 and 56. The opening 58 in the hinge member 56 that receives the pin 57 is elongated so that the front plate 22 can translate toward the back plate 28 of the receptacle 21 as well as pivot with respect to the receptacle. The result is that the front plate can move uniformly toward the front plate over the whole area enclosed by the gasket member when a vacuum is drawn in the film-holder.

The front plate 22 may be transparent to light over its whole surface or over part of its surface, and of course, must pass X-rays to permit exposure of X-ray film within the holder. Clips (not shown) may be attached to the outside of the front plate to hold an X-ray grid useful to reduce secondary radiations and thus obtain sharper images. Preferably the film-holder includes a lead foil (not shown) or similar structure between the radiation-intensifying screen and pressure plate to prevent secondary radiations from imaging the film; the pressure plate itself can also serve this function if made of appropriate material. The edgewalls of the film-holder may be wholly formed of a resilient material instead of comprising a resilient gasket member over a rigid base edgewall, though use of a rigid base edgewall such as the base edgewall 30 is preferred.

A film-holder of the invention may also include apparatus for marking identifying information onto a film in the film holder. Apparatus of this type is described in the above-identified Shaffer application, Ser. No. 363,966.

What is claimed is:

1. A rapidly loaded film-holder adapted to be mounted in a vertical position and to hold X-ray film under vacuum pressure while the film is exposed, comprising (1) a shallow receptacle that comprises a rigid large-area back plate and edgewalls attached around the periphery of the back plate, the edgewalls extending perpendicularly from one side of the back plate to define an open front of the receptacle, and the edgewalls comprising at least at their outer extremity a resilient gasket member that extends continuously around the open front of the receptacle and whose outer extremity defines a single plane; (2) a rigid large-area front plate pivotably attached to the receptacle in position to rest against the outer extremity of the gasket member to close the receptacle and adapted to be drawn toward the back plate a uniform amount over the whole area enclosed by the gasket member; (3) a pressure plate supported in front of and parallel to the back plate; (4) a first intensifying screen attached over the pressure plate and a second intensifying screen attached over the inside surface of the front plate; (5) limiting means for limiting pivotal movement of the front plate from its closed position to an opened rest position; (6) positioning means on said front plate for holding said X-ray film in defined positions on the inside surface of the front plate; (7) engagement means for holding the front plate in closed position in engagement against the gasket member; and (8) an exhaust port located in the receptacle or front plate for attachment to a vacuum source, whereby a vacuum may be formed within the film-holder to draw the front plate toward the bottom plate and tightly sandwich film between the two intensifying screens.

2. A film-holder of claim 1 in which the pressure plate is supported away from the back plate by resiliently compressible means.

3. A film-holder of claim 1 in which the front plate is attached to the receptacle by hinge means that comprise one hinge member attached to the receptacle and another hinge member attached to the front plate, the hinge members being interconnected by a pin that is movable with respect to at least one of the hinge members whereby the front plate can move toward the back plate of the receptacle at the point of connection of the hinge means as well as to pivot with respect to the receptacle.

4. A film-holder of claim 1 in which the limiting means comprises cords attached to two opposite edges of the front plate, and the engagement means comprises spring tension means normally holding the cords in rolls that are attached to the receptacle so that the cords are extendible against the spring tension when the front plate is moved from its closed position to its opened position, but tend to draw the front plate against the gasket member when the cords are wound in a roll.

5. A film-holder of claim 1 in which the positioning means comprises flexible tabs extending at an angle from the inside surface of the front plate.

6. A film-holder of claim 1 in which clip means are attached to the pressure plate to hold X-ray film in defined positions against the intensifying screen on the pressure plate.

* * * * *